United States Patent
Sakaue et al.

(10) Patent No.: US 10,675,902 B2
(45) Date of Patent: Jun. 9, 2020

(54) INSULATOR FILM FORMATION METHOD BY FLEXOGRAPHIC PRINTING AND FLEXOGRAPHIC PRINTING PLATE

(71) Applicant: JAPAN AVIATION ELECTRONICS INDUSTRY, LIMITED, Tokyo (JP)

(72) Inventors: Akitoshi Sakaue, Tokyo (JP); Naoki Iwao, Tokyo (JP); Mitsunori Sato, Tokyo (JP); Yutaka Takezawa, Tokyo (JP); Yutaro Kogawa, Tokyo (JP); Mitsutoshi Naito, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 153 days.

(21) Appl. No.: 15/246,873

(22) Filed: Aug. 25, 2016

(65) Prior Publication Data
US 2017/0113453 A1  Apr. 27, 2017

(30) Foreign Application Priority Data

Oct. 21, 2015 (JP) .................. 2015-206850

(51) Int. Cl.
*B41M 3/00* (2006.01)
*B41F 5/24* (2006.01)
(Continued)

(52) U.S. Cl.
CPC ............ *B41M 3/00* (2013.01); *B41F 5/24* (2013.01); *B41M 1/04* (2013.01); *B41M 3/006* (2013.01);
(Continued)

(58) Field of Classification Search
None
See application file for complete search history.

(56) References Cited

U.S. PATENT DOCUMENTS 4,101,324 A * 7/1978 Mizuno ................. G03F 7/115
                                                        430/262
4,124,947 A * 11/1978 Kuhl ......................... B41M 3/14
                                                        101/150

(Continued)

FOREIGN PATENT DOCUMENTS

CN  1514283 A   7/2004
CN  1688935 A  10/2005
(Continued)

OTHER PUBLICATIONS

Machine Translation of JP 11221976 A, Aug. 1999 (Year: 1999).*
(Continued)

*Primary Examiner* — Jeffrey A Vonch
(74) *Attorney, Agent, or Firm* — Greenblum & Bernstein, P.L.C.

(57) ABSTRACT

A method of forming an insulator film by flexographic printing is provided with which an insulator film is formed on a printing object by using ink as an insulator film material and a flexographic printing plate with halftone dots convexly formed on a convex portion thereof that defines a printing pattern. A halftone dot condition change region with a condition of the halftone dots varied such that an ink retention volume therein is smaller than that in other region on the convex portion is provided on a part of the convex portion corresponding to an edge of the printing pattern.

12 Claims, 5 Drawing Sheets

(51) Int. Cl.
  *B41M 1/04* (2006.01)
  *B41N 1/00* (2006.01)
  *B41N 1/16* (2006.01)
  *G02F 1/1337* (2006.01)
  *G06F 3/044* (2006.01)
  *B41N 1/12* (2006.01)
  *B41N 1/22* (2006.01)
  *B41F 19/00* (2006.01)
  *G02F 1/13* (2006.01)
  *B41M 1/26* (2006.01)

(52) U.S. Cl.
  CPC .............. *B41N 1/00* (2013.01); *B41F 19/001* (2013.01); *B41M 1/26* (2013.01); *B41N 1/12* (2013.01); *B41N 1/16* (2013.01); *B41N 1/22* (2013.01); *B41P 2200/12* (2013.01); *B41P 2217/50* (2013.01); *G02F 1/1303* (2013.01); *G02F 1/1337* (2013.01); *G02F 1/13378* (2013.01); *G06F 3/044* (2013.01); *G06F 2203/04103* (2013.01)

(56) References Cited

U.S. PATENT DOCUMENTS

| | | | | |
|---|---|---|---|---|
| 5,435,247 | A * | 7/1995 | Giori | B41M 3/14 101/395 |
| 5,884,560 | A * | 3/1999 | Opitz | B41M 1/02 101/401 |
| 5,892,588 | A * | 4/1999 | Samworth | H04N 1/405 358/1.9 |
| 6,213,018 | B1 * | 4/2001 | Samworth | B41M 1/04 101/352.13 |
| 2002/0083855 | A1 * | 7/2002 | Samworth | B41M 1/04 101/352.13 |
| 2003/0038976 | A1 * | 2/2003 | Masotti | H04N 1/4057 358/3.12 |
| 2003/0084803 | A1 * | 5/2003 | Gross | B41C 1/00 101/395 |
| 2003/0107768 | A1 * | 6/2003 | Crounse | H04N 1/4051 358/3.3 |
| 2004/0038010 | A1 * | 2/2004 | Kim | G02F 1/133784 428/195.1 |
| 2004/0126540 | A1 * | 7/2004 | Byun | G02F 1/133784 428/156 |
| 2004/0160644 | A1 * | 8/2004 | Samworth | B41M 1/04 358/3.09 |
| 2004/0177782 | A1 * | 9/2004 | McCrea | B41C 1/00 101/453 |
| 2004/0185188 | A1 * | 9/2004 | Amano | B41C 1/00 428/1.51 |
| 2004/0246420 | A1 * | 12/2004 | Morimoto | G02F 1/1337 349/124 |
| 2005/0157347 | A1 * | 7/2005 | Dewitte | B41M 1/04 358/3.3 |
| 2005/0199145 | A1 * | 9/2005 | Morimoto | B41C 1/02 101/401 |
| 2006/0016355 | A1 | 1/2006 | Saai et al. | |
| 2006/0204718 | A1 * | 9/2006 | Kawakami | G02B 5/02 428/141 |
| 2007/0134561 | A1 * | 6/2007 | Butterfield | G03F 7/2014 430/5 |
| 2007/0190452 | A1 * | 8/2007 | Kimelblat | B41C 1/05 430/270.1 |
| 2008/0085361 | A1 | 4/2008 | Satou et al. | |
| 2008/0239189 | A1 * | 10/2008 | Hatta | H01L 29/7869 349/46 |
| 2010/0143841 | A1 * | 6/2010 | Stolt | B41M 1/04 430/270.1 |
| 2010/0224091 | A1 * | 9/2010 | Zwadlo | B41C 1/00 101/401.1 |
| 2011/0079158 | A1 * | 4/2011 | Recchia | G03F 7/201 101/395 |
| 2011/0252990 | A1 * | 10/2011 | Shimazaki | B41C 1/05 101/401.1 |
| 2011/0255134 | A1 * | 10/2011 | Shigeta | B41C 1/05 358/3.3 |
| 2011/0315035 | A1 * | 12/2011 | Muraoka | B41F 17/001 101/483 |
| 2012/0048135 | A1 * | 3/2012 | Burberry | B41C 1/05 101/483 |
| 2012/0060711 | A1 * | 3/2012 | Rudolph | G02F 1/133711 101/451 |
| 2013/0017493 | A1 * | 1/2013 | Cook | G03F 7/202 430/306 |
| 2013/0075376 | A1 * | 3/2013 | Shigeta | B41C 1/05 219/121.69 |
| 2013/0168138 | A1 * | 7/2013 | Yamazaki | G06F 3/041 174/253 |
| 2013/0201528 | A1 * | 8/2013 | Morisse | H04N 1/405 358/3.1 |
| 2014/0090569 | A1 * | 4/2014 | Yamazaki | B41F 3/54 101/217 |
| 2014/0168596 | A1 * | 6/2014 | Yuge | B41M 1/04 349/187 |
| 2014/0231762 | A1 * | 8/2014 | Choi | H01L 21/76805 257/40 |
| 2014/0375921 | A1 * | 12/2014 | Moriya | G02F 1/136227 349/43 |
| 2015/0101745 | A1 * | 4/2015 | Ramakrishnan | B41F 5/24 156/250 |
| 2015/0122138 | A1 * | 5/2015 | Van Ostrand | B41F 5/24 101/216 |
| 2015/0138476 | A1 * | 5/2015 | Hyodo | G02F 1/136227 349/43 |
| 2016/0009071 | A1 * | 1/2016 | Yamazaki | B41N 1/12 101/375 |
| 2016/0009072 | A1 * | 1/2016 | Yamazaki | B23K 37/0235 101/216 |
| 2016/0014896 | A1 * | 1/2016 | Mansky | G02F 1/13439 174/258 |
| 2016/0020131 | A1 * | 1/2016 | Bower | B41F 16/00 294/213 |
| 2016/0048045 | A1 * | 2/2016 | Imai | G02F 1/1337 349/123 |
| 2016/0139465 | A1 * | 5/2016 | Yang | G02F 1/1333 428/1.2 |
| 2016/0144394 | A1 * | 5/2016 | Zheng | G02F 1/1303 118/200 |
| 2016/0221379 | A1 * | 8/2016 | Namba | B41N 1/12 |
| 2016/0320645 | A1 * | 11/2016 | Kim | G02F 1/1337 |
| 2016/0342031 | A1 * | 11/2016 | Xue | G02F 1/133514 |
| 2016/0347106 | A1 * | 12/2016 | Wang | B41F 17/26 |
| 2017/0021377 | A1 * | 1/2017 | Wang | G02F 1/133788 |
| 2017/0106688 | A1 * | 4/2017 | Li | B41N 1/06 |
| 2017/0157966 | A1 * | 6/2017 | Becker | B41M 1/04 |
| 2017/0313117 | A1 * | 11/2017 | Tashiro | B41C 1/05 |
| 2017/0348993 | A1 * | 12/2017 | Namba | B41C 1/05 |
| 2017/0368863 | A1 * | 12/2017 | Morikawa | B41C 1/05 |
| 2018/0056699 | A1 * | 3/2018 | Tashiro | B41C 1/05 |
| 2018/0186161 | A1 * | 7/2018 | Morikawa | B41C 1/18 |

FOREIGN PATENT DOCUMENTS

| | | | | |
|---|---|---|---|---|
| CN | 101441367 A | * | 5/2009 | |
| CN | 102069652 A | * | 5/2011 | |
| CN | 102375268 A | * | 3/2012 | |
| CN | 202256967 U | * | 5/2012 | |
| CN | 202306070 U | * | 7/2012 | |
| CN | 202472187 U | * | 10/2012 | |
| CN | 103080876 A | | 5/2013 | |
| CN | 203012303 U | * | 6/2013 | |
| DE | 102012006558 A1 | * | 10/2013 | ............... B41C 1/05 |
| ES | 2238012 A1 | * | 8/2005 | ............... B41N 1/12 |
| JP | 57066419 A | * | 4/1982 | ........... G02F 1/1337 |
| JP | 63188046 A | * | 8/1988 | |
| JP | 03038374 A | * | 2/1991 | |
| JP | 03061593 A | * | 3/1991 | |
| JP | 06214377 A | * | 8/1994 | |
| JP | 06230385 A | * | 8/1994 | |

(56) References Cited

FOREIGN PATENT DOCUMENTS

| | | | |
|---|---|---|---|
| JP | H07-020472 A | | 1/1995 |
| JP | 07270795 A * | | 10/1995 |
| JP | 08020172 A * | | 1/1996 |
| JP | 10-217418 | | 8/1998 |
| JP | 11059004 A * | | 3/1999 |
| JP | 11-221976 | | 8/1999 |
| JP | 11221976 A * | | 8/1999 |
| JP | 2000338491 A * | | 12/2000 |
| JP | 2001-051259 | | 2/2001 |
| JP | 2001171066 A * | | 6/2001 |
| JP | 2001276720 A * | | 10/2001 |
| JP | 2002178654 A * | | 6/2002 |
| JP | 2002-293049 | | 10/2002 |
| JP | 2002293049 A * | | 10/2002 |
| JP | 2003-43487 | | 2/2003 |
| JP | 2003-53927 | | 2/2003 |
| JP | 2003043487 A * | | 2/2003 |
| JP | 2003053927 A * | | 2/2003 |
| JP | 2004-42349 | | 2/2004 |
| JP | 2004322329 A * | | 11/2004 |
| JP | 2008000927 A * | | 1/2008 ............... B41N 1/12 |
| JP | 2009078501 A * | | 4/2009 |
| JP | 2009166481 A * | | 7/2009 |
| JP | 2009234051 A * | | 10/2009 |
| JP | 2009272143 A * | | 11/2009 |
| JP | 2009286113 A * | | 12/2009 |
| JP | 2010158883 A * | | 7/2010 |
| JP | 2010-214944 | | 9/2010 |
| JP | 2010247483 A * | | 11/2010 |
| JP | 2012-11666 | | 1/2012 |
| JP | 2012011666 A * | | 1/2012 |
| JP | 2012011667 A * | | 1/2012 |
| JP | 2012200978 A * | | 10/2012 |
| KR | 20060134694 A * | | 12/2006 |
| KR | 20080057784 A * | | 6/2008 |
| KR | 10-2009-0073313 | | 7/2009 |
| KR | 2009073313 A * | | 7/2009 |
| KR | 10-2014-0104573 | | 8/2014 |
| KR | 101416581 B1 * | | 8/2014 |
| TW | 200811253 | | 3/2008 |
| WO | WO-2006082777 A1 * | | 8/2006 ............... B41N 1/12 |
| WO | 2015/056703 | | 4/2015 |

OTHER PUBLICATIONS

Machine Translation of JP 2002293049 A, Oct. 2002 (Year: 2002).*
Machine Translation of KR 2009073313 A, Jul. 2009 (Year: 2009).*
Machine Translation of DE 102012006558 A1, Oct. 2013 (Year: 2013).*
Machine Translation of KR-101416581-B1, Aug. 2014 (Year: 2014).*
Full Machine Translation for JP 07-020472 A, Jan. 1995 (Year: 1995).*
Machine Translation of JP-2008000927-A, Jan. 2008 (Year: 2008).*
Office Action issued in Chinese Family Member Patent Appl. No. 201610729374.6, dated Dec. 7, 2018, along with an English translation thereof.
Office Action issued in Japan family member Patent Appl. No. 2017-199271, dated Aug. 21, 2018, along with an English translation thereof.
Office Action in Taiwan Application No. 105126098 dated Feb. 22, 2017 with English language translation.
Office Action in JP Application No. 2015-206850, with an English language translation, dated Aug. 22, 2017.
Office Action in Korea Application No. 10-2016-0107441 with English language translation, dated May 17, 2017.
Office Action issued in China family member patent Appl. No. 201610729374.6, dated Apr. 28, 2018, along with an English-language translation thereof.
Office Action issued in China Counterpart Patent Appl. No. 201610729374.6, dated May 20, 2019, along with an English translation thereof.
Office Action issued in Japanese family member Patent Appl. No. 2017199271, dated Mar. 5, 2019, along with an English translation thereof.

* cited by examiner

INSULATOR FILM FORMATION METHOD BY FLEXOGRAPHIC PRINTING AND FLEXOGRAPHIC PRINTING PLATE

TECHNICAL FIELD

The present invention relates to a method of forming an insulator film by flexographic printing and a flexographic printing plate used in the method.

BACKGROUND ART

If not vacuum processing such as sputtering but a printing process can be used in a process of forming a film such as an insulator film or a conductor film, not only improvement in productivity but also cost reduction due to unnecessity of an expensive film forming apparatus will be expected.

Japanese Patent Application Laid Open No. 2001-51259 (hereinafter referred to as "Patent Literature 1") discloses that, in a substrate used for a liquid crystal device, a surface protection film which is an insulator film covering an electrode pattern formed as a conductor film on the substrate is formed by flexographic printing. FIGS. 1A, 1B, 2A, and 2B illustrate an insulator film formed by flexographic printing as disclosed in Patent Literature 1. In FIGS. 1A, 1B, 2A, and 2B, reference numeral 11 represents the substrate, reference numeral 12 represents the electrode pattern (conductor film), and reference numerals 13, 13a, and 13b represent a coating film, a lower coating film, and an upper coating film, respectively, each of which is formed with a liquid precursor for forming an insulator film transcribed and applied on the electrode pattern 12.

Patent Literature 1 describes the following technical matters with reference to FIGS. 1A, 1B, 2A, and 2B.

Figure 1A:
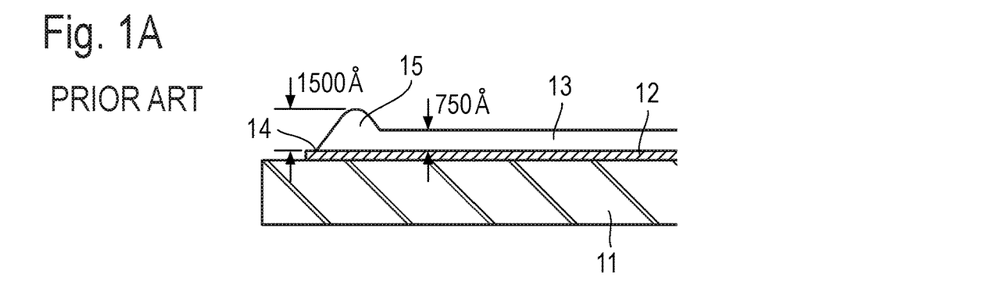
FIG. 1A is a sectional view illustrating a part of an edge of an insulator film formed by conventional flexographic printing.

(1) When a liquid precursor is applied by flexographic printing, as illustrated in FIG. 1A, a part in the vicinity of an edge 14 of the coating film 13 is protruded such that the film thickness thereof is approximately twice the film thickness of the inner region of the film, and when the thickness of this protrusion 15 approaches around 1500 Å, cracking occurs on the occasion of cleaning and rubbing treatment. Such cracking causes the coating film 13 to be peeled off. In FIG. 1A, the thickness limit of the surface protection film that can be formed is 750 Å.

Figure 1B:
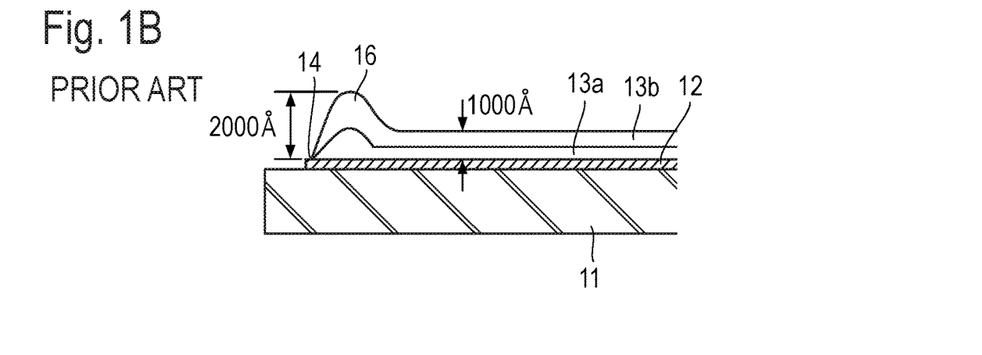
FIG. 1B is a sectional view illustrating a part of an edge of an insulator film formed by double coating (overprinting) by conventional flexographic printing.

(2) As illustrated in FIG. 1B, when a method is employed in which the lower coating film 13a is formed by flexographic printing and then flexographic printing is performed again to form the upper coating film 13b and thereafter the upper coating film 13b and the lower coating film 13a are hardened, cracking occurs on the occasion of cleaning and rubbing treatment afterwards when the thickness of the protrusion 16 in the vicinity of the edge 14 approaches approximately 2000 Å. In FIG. 1B, the thickness limit of the surface protection film that can be formed is 1000 Å.

Figure 2A:
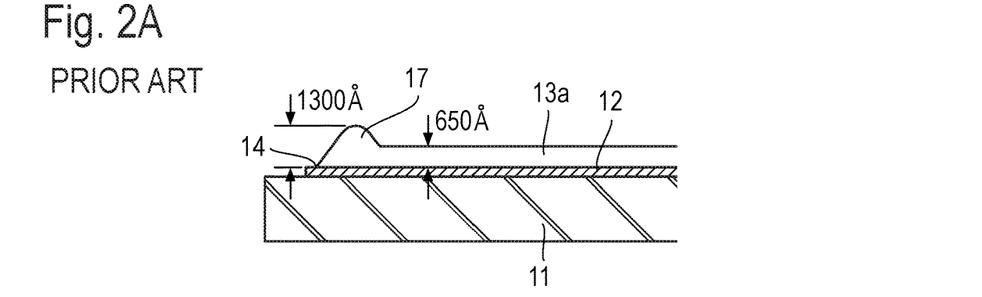
FIG. 2A is a sectional view illustrating a part of an edge of an insulator film formed by conventional flexographic printing.
Figure 2B:
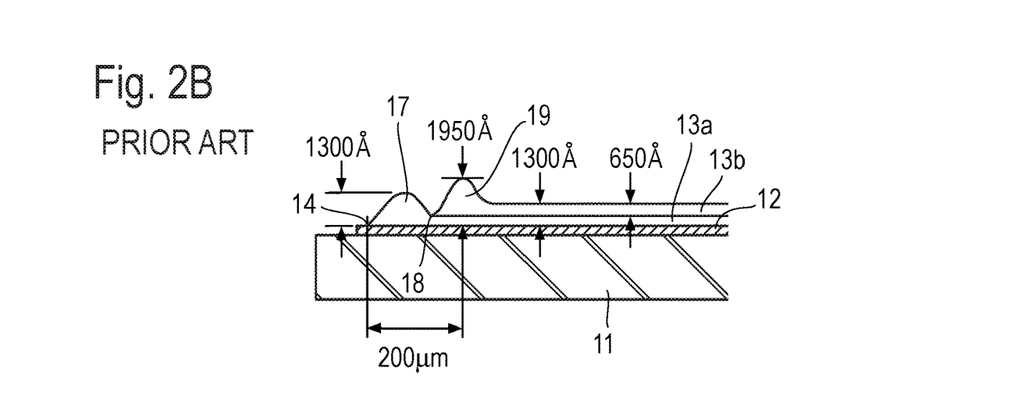
FIG. 2B is a sectional view illustrating a state in which overprinting of the insulator film is performed on the structure illustrated in FIG. 2A by flexographic printing with edges shifted.

(3) As illustrated in FIG. 2A, the lower coating film 13a the film thickness of which is about 650 Å is formed, and then, as illustrated in FIG. 2B, the upper coating film 13b the film thickness of which is about 650 Å is formed. At this time, the upper coating film 13b is formed such that an edge 18 of the upper coating film 13b is positioned approximately 200 μm inside from the edge 14 of the lower coating film 13a. A protrusion 17 of the lower coating film 13a does not overlap with a protrusion 19 of the upper coating film 13b. Even at the part at which the sum of the film thickness of the lower coating film 13a and that of the upper coating film 13b is the maximum (namely, where the protrusion 19 is generated), the film thickness is approximately 1950 Å, which is lower than 2000 Å. Accordingly, in FIGS. 2A and 2B, a surface protection film the film thickness of which is 1300 Å can be formed and the film thickness of the part where the protrusion 19 is generated is only approximately 1950 Å. With this, no cracking occurs.

As described above, Patent Literature 1 discloses that, in forming an insulator film by flexographic printing, cracking occurs when a protrusion generated on an edge of the insulator film is thick, and that the insulator film is formed by double coating in which the edges are shifted so that a thick insulator film can be formed and yet occurrence of cracking can be avoided.

Such a protrusion generated when an insulator film is formed by flexographic printing is generated not only on the outer periphery of a printing pattern but also inside the printing pattern. For example, when there is a hole that is a part not printed inside the printing pattern (a blank space in which no ink is transcribed), a protrusion is generated around the hole.

On the other hand, with respect to the insulator film, in addition to the one used as a surface protection film as disclosed in Patent Literature 1, there is one that is formed between two conductor films, for example. When this insulator film formed between two conductor films includes a through hole for connecting the two conductor films and conducting the connected films, the printing pattern is to have a hole corresponding to the through hole. With this, a protrusion is generated around the through hole in the insulator film.

When in the insulator film there is a protrusion around the through hole that is used for connecting the two conductor films, in other words, used for conductor joining and thus the film thickness of the insulator film is large thereat, a conductor joining failure is caused. This will be explained below with reference to the drawings.

Figure 3A:
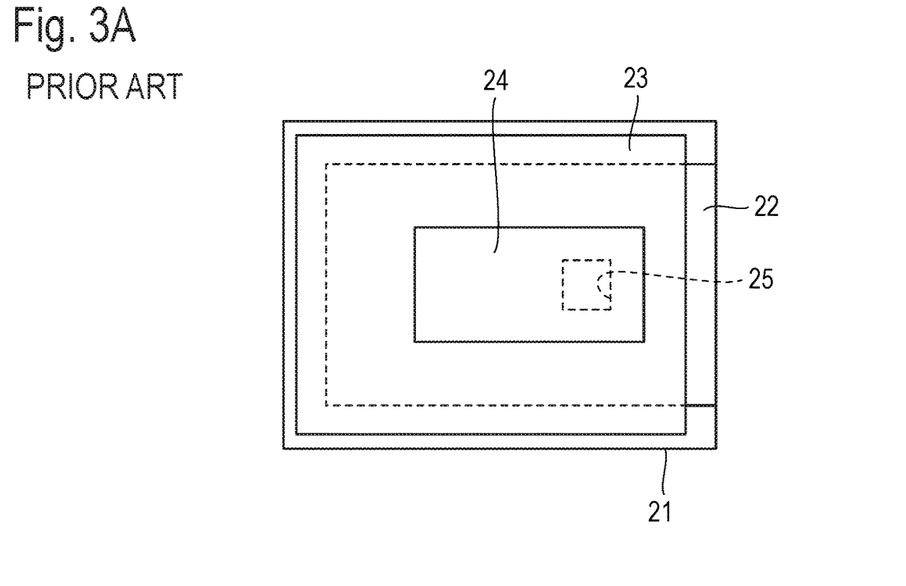
FIG. 3A is a diagram illustrating a schematic structure in which an insulator film having a through hole, which is formed by flexographic printing, is present between two conductor films.

FIG. 3A illustrates a schematic structure for the explanation. In this structure, a first conductor film 22, an insulator film 23 and a second conductor film 24 are sequentially layered in order on a substrate 21. In FIG. 3A, reference numeral 25 represents a through hole provided on the insulator film 23 to connect the second conductor film 24 to the first conductor film 22.

Figure 3B:
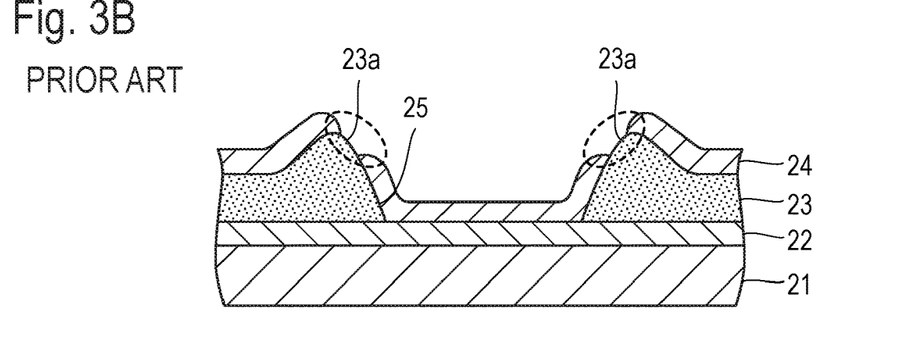
FIG. 3B is an enlarged sectional view of a part of the through hole of the insulator film illustrated in FIG. 3A.

FIG. 3B illustrates a cross section of the part of the through hole 25. With a protrusion 23a of the insulator film 23, the film thickness of the insulator film 23 around the through hole 25 is large. With this, the second conductor film 24 is to be formed on a part having a large level difference. For this reason, on the parts surrounded by broken lines in FIG. 3B, defects of the second conductor film 24 which raise problems of electrical conduction continuity are generated, that is, poor electrical connection between the two conductor films due to breaks is generated.

Figure 3C:
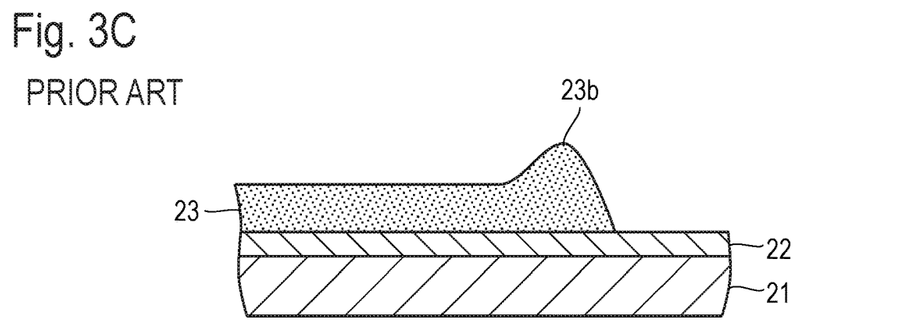
FIG. 3C is an enlarged sectional view of a part of an outer periphery edge of the insulator film illustrated in FIG. 3A.

FIG. 3C illustrates a cross section of the part of an outer periphery edge of the insulator film 23 formed on the first conductor film 22. A protrusion 23b of the insulator film 23 causes bleeding of the insulator film 23, and thus causes displacement of the insulator film 23 from the position on which the insulator film 23 is to be formed and impairs the edge linearity of the insulator film 23.

SUMMARY OF THE INVENTION

In view of the problem described above, an object of the present invention is to provide a method of forming an insulator film by flexographic printing and a flexographic printing plate, with which generation of protrusions on an edge of a printing pattern can be prevented.

A method according to the present invention includes a step of forming an insulator film on a printing object by using ink as an insulator film material and a flexographic printing plate with halftone dots convexly formed on a convex portion thereof that defines a printing pattern. A halftone dot condition change region with a condition of the halftone dots varied such that an ink retention volume therein is smaller than that in other region on the convex portion is provided on a part of the convex portion corresponding to an edge of the printing pattern.

The flexographic printing plate according to the present invention is a flexographic printing plate with halftone dots convexly formed on a convex portion thereof that defines a printing pattern. A halftone dot condition change region with a condition of the halftone dots varied such that an ink retention volume therein is smaller than that in other region on the convex portion is provided on a part of the convex portion corresponding to an edge of the printing pattern.

EFFECTS OF THE INVENTION

The present invention can prevent generation of a protrusion in a film thickness direction, around an edge of a printing pattern.

DETAILED DESCRIPTION

An embodiment of the present invention will be described on the basis of a working example with reference to the drawings.

Figure 4A:
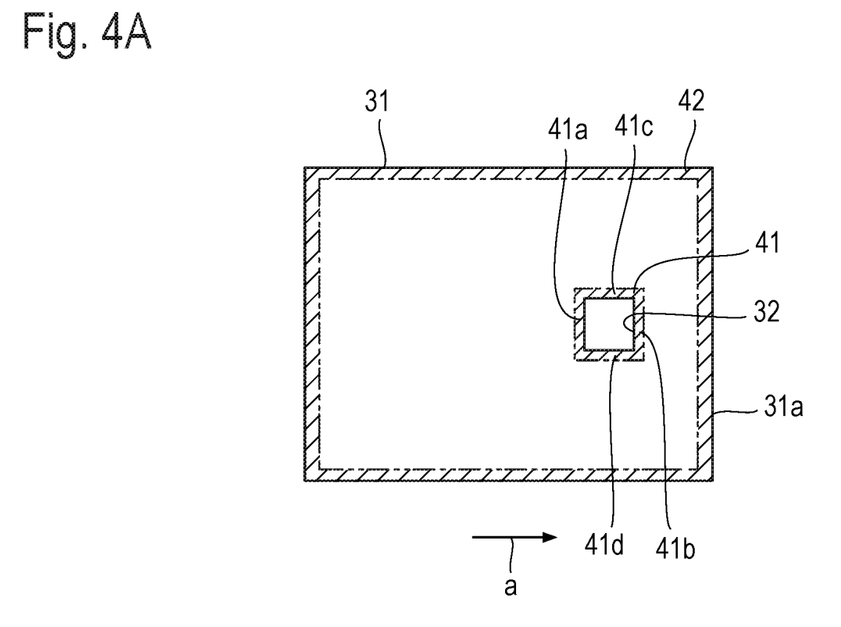
FIG. 4A is a diagram for explaining a structure of a flexographic printing plate of an embodiment according to the present invention.

FIG. 4A illustrates a structure of a flexographic printing plate of an embodiment according to the present invention. In FIG. 4A, only a convex portion 31 defining a printing pattern of the flexographic printing plate is illustrated and illustration of halftone dots convexly formed on the convex portion 31 is omitted.

The convex portion 31 of the flexographic printing plate illustrated in FIG. 4A is designed to form an insulator film 23 illustrated in FIG. 3A described above. In this example, halftone dot condition change regions 41 and 42 are provided on the convex portion 31, in which conditions of halftone dots for transferring an ink as an insulator film material, such as polyimide, epoxy resin, or acrylic resin, from an anilox roll to a printing object are varied relative to other region on the convex portion 31. It should be noted that, in FIG. 4A, the halftone dot condition change regions 41 and 42 are illustrated in a hatched manner.

The halftone dot condition change region 41 is provided as a loop-shaped region around a hole 32 of the printing pattern corresponding to a through hole 25 (see FIG. 3A) formed on the insulator film 23. The halftone dot condition change region 42 is provided over the entire outer periphery of the printing pattern. The halftone dot condition is selected such that an ink retention volume in each of halftone dot condition change regions 41 and 42 is smaller than that in other region (namely, the region other than the halftone dot condition change regions 41 and 42). In this example, the halftone dot condition in the halftone dot condition change region 41 is further varied in a stepwise fashion and concentrically in the loop-shaped region as described later. The widths of the halftone dot condition change regions 41 and 42 (widths measured from the printing pattern edges) are about 0.5 to 5 mm, for example.

Figure 4B:
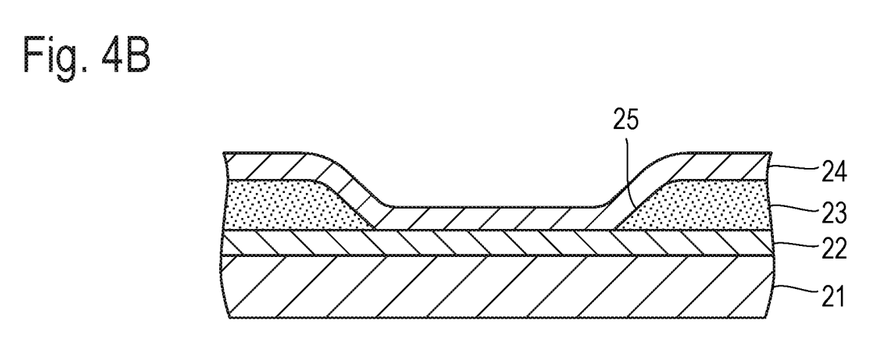
FIG. 4B is an enlarged sectional view illustrating a part of a through hole of an insulator film when the insulator film between two conductor films is print-formed with the flexographic printing plate having the structure illustrated in FIG. 4A.
Figure 4C:
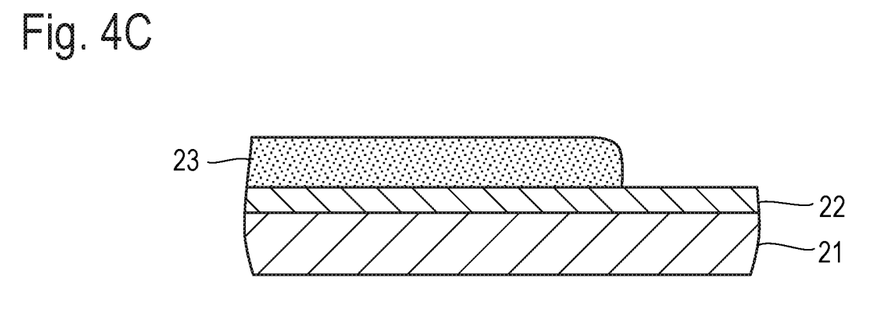
FIG. 4C is an enlarged sectional view illustrating a part of an outer periphery edge of the insulator film when the insulator film is print-formed with the flexographic printing plate having the structure illustrated in FIG. 4A.

FIGS. 4B and 4C illustrate a cross section of the through hole 25 on the insulator film 23 and a cross section of a part of an outer periphery edge of the insulator film 23 positioned on a first conductor film 22, respectively, when the flexographic printing plate with the halftone dot condition change regions 41 and 42 provided thereon as described above is used to form the insulator film 23. The insulator film 23 is formed by flexographic printing on the first conductor film 22 formed on a substrate 21, and a second conductor film 24 is further formed on the insulator film 23, similarly to the structure in FIG. 3A described above.

By providing the halftone dot condition change regions 41 and 42 on parts corresponding to the printing pattern edges, in which the ink retention volumes are smaller, generation of protrusions at the printing pattern edges of the insulator film 23 can be prevented. Furthermore, by selecting halftone dot conditions for each region, or preferably by adopting the halftone dot conditions each varying in a stepwise fashion, an edge shape of the insulator film 23 as illustrated in FIG. 4B or an edge shape of the insulator film 23 as illustrated in FIG. 4C can be obtained.

In FIG. 4B, protrusions are not generated on the insulator film 23, and the insulator film 23 is formed such that the inner wall surface of the through hole 25 forms a gentle slope surface towards the first conductor film 22. With this, the second conductor film 24 can be desirably formed with no defects of the second conductor film 24 generated as illustrated in FIG. 3B, whereby poor electrical connection of the second conductor film 24 to the first conductor film 22 can be prevented.

On the other hand, because the part of the outer periphery edge of the insulator film 23 is formed so as to have no protrusions as illustrated in FIG. 4C, bleeding on the insulator film 23 can be suppressed.

The halftone dot condition will now be described. The halftone dot condition includes the number of lines (unit: LPI (lines per inch)) and the halftone dot area ratio (namely, halftone dot percent). By changing these values, the ink retention volume (in other words, the amount of ink transcribed to the printing object) can be adjusted.

An example of specific values for the halftone dot condition will be described.

When the halftone dot condition of the flexographic printing plate forming the insulator film 23 is set to 300 LPI and the halftone dot area ratio of 70%, the halftone dot condition of the halftone dot condition change region 41 is defined such that parts 41a, 41b, 41c and 41d in FIG. 4A which form the loop-shaped region thereof are changed in a stepwise fashion and concentrically from the outside to the inside, from 400 LPI to 500 LPI and then to 600 LPI with the halftone dot area ratio of 70% unchanged, for example. This can reduce the ink retention volume in the halftone dot condition change region 41 and form the gentle slope surface on an edge of the insulator film 23.

As exemplified above, the halftone dots in the present disclosure have characteristic that can reduce an ink retention volume by increasing only the value of the number of lines while constantly maintaining the value of the halftone dot area ratio.

Figure 6A:
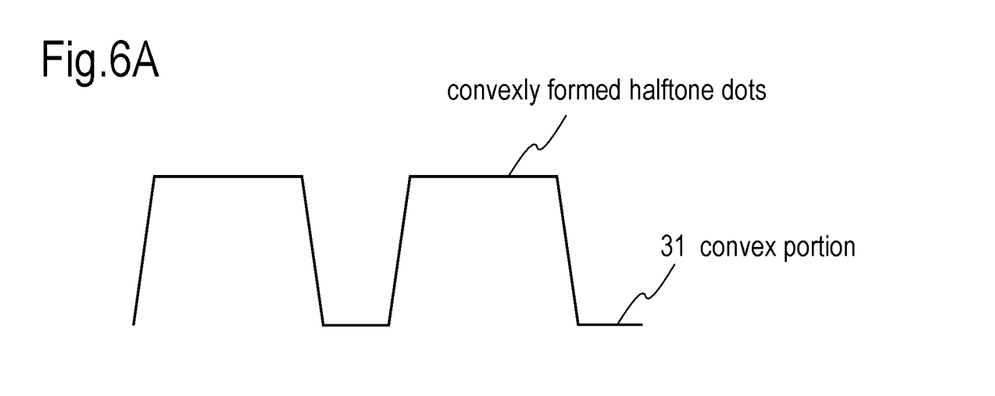
FIG. 6A is a vertical sectional view of halftone dots convexly formed on a convex portion.
Figure 6B:
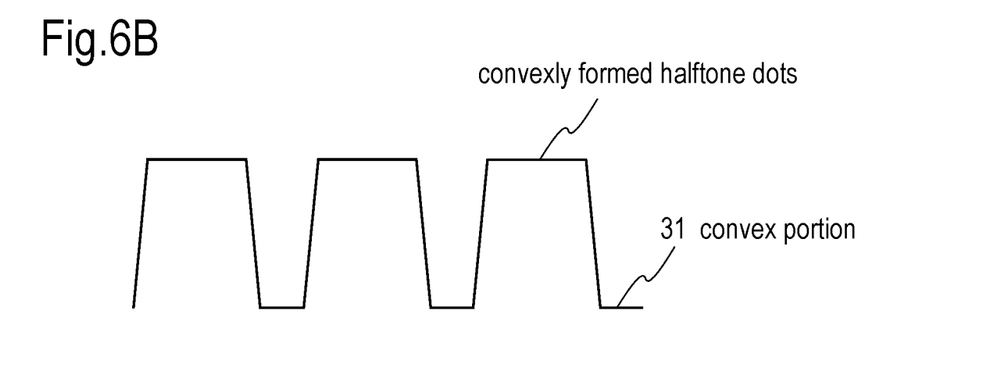
FIG. 6B is a vertical sectional view of halftone dots convexly formed on a convex portion, a number of lines of the same being larger than that shown in FIG. 6A.
Figure 6C:
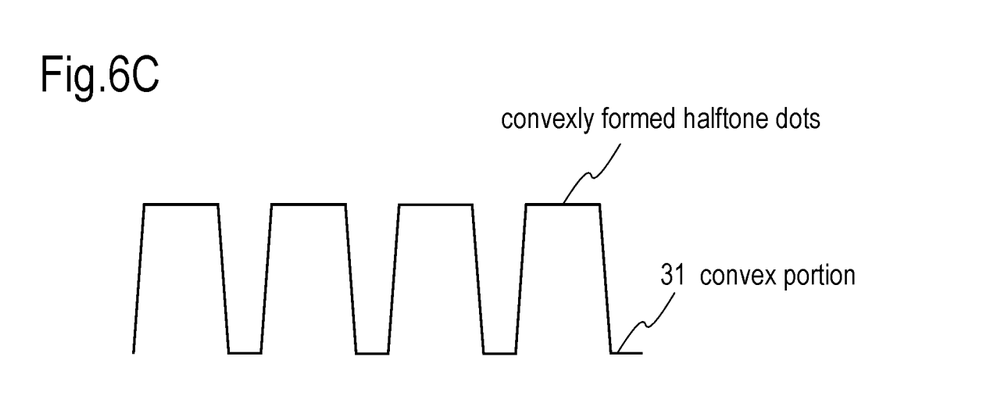
FIG. 6C is a vertical sectional view of halftone dots convexly formed on a convex portion, a number of lines of the same being larger than that shown in FIG. 6B.

Examples of manners that increase only the value of the number of lines while constantly maintaining the value of the halftone dot area ratio are as shown in FIGS. 6A to 6C. FIGS. 6A to 6C illustrate vertical sectional views of halftone dots convexly formed on the convex portion 31.

Here, the halftone dot area ratio, which is the ratio of the area occupied by the halftone dots over the whole of the convex portion 31, in a plain viewed onto the convex portion 31 from above, is constant among FIGS. 6A to 6C, but the number of lines, which is the number of halftone dots per unit length in the transverse direction of the figures, increase in order of FIGS. 6A, 6B, and 6C. Moreover, the ink retention volume of the halftone dots conversely decreases in order of FIGS. 6A, 6B, and 6C, and is at a minimum in FIG. 6C.

Protrusions on a printing pattern edge depend on the printing direction when the insulator film 23 is formed by flexographic printing. Especially, prominent protrusions are generated on an edge at the rear end side in the printing direction. The halftone dot condition change region 42 in FIG. 4A is provided over the entire outer periphery of the printing pattern. However, the halftone dot condition change region 42 may be provided only on a part corresponding to the edge at the rear end side in the printing direction of the printing pattern, for example. In this case, the halftone dot condition change region 42 is to be provided only a part of a region in contact with the outer periphery of the convex portion 31. When the arrow indicated by a reference character "a" in FIG. 4A represents the printing direction, the halftone dot condition change region 42 is to be provided only on the side of a right side 31a of the convex portion 31.

Furthermore, the halftone dot condition in each of the halftone dot condition change regions 41 and 42 may be set in view of the printing direction. For example, when the printing direction is defined by the arrow with the reference character "a" and sufficient connection of the second conductor film 24 with the first conductor film 22 can be achieved by absence of protrusions even without a slope surface formed on the inner wall surface of the through hole 25, the halftone dot area ratio of each of the sides 41a, 41b, 41c, and 41d on the halftone dot condition change region 41 formed in a square frame shape may be set to 70% and the number of line may be set to 600 LPI for the side 41a, 500 LPI for the side 41b, and 400 LPI for the sides 41c and 41d.

Furthermore, the halftone dot condition in each of the halftone dot condition change regions 41 and 42 may be defined by a combination of a stepwise variation towards the printing pattern edge inside the regions and a variation based on the printing direction.

The insulator film formation method by flexographic printing and the flexographic printing plate as an embodiment of the present invention have been described above. According to the embodiment of the present invention, a phenomenon of bleeding of the printing pattern edge caused by the protrusions can be prevented. According to the embodiment of the present invention, when the insulator film formed between two conductor films has a through hole for connecting the two conductor films, for example, a phenomenon of poor electrical connection caused by protrusions around the through hole on the insulator film can be prevented.

Next, as a specific example in which the present invention can be applied, a capacitive touch panel will be described.

Figure 5A:
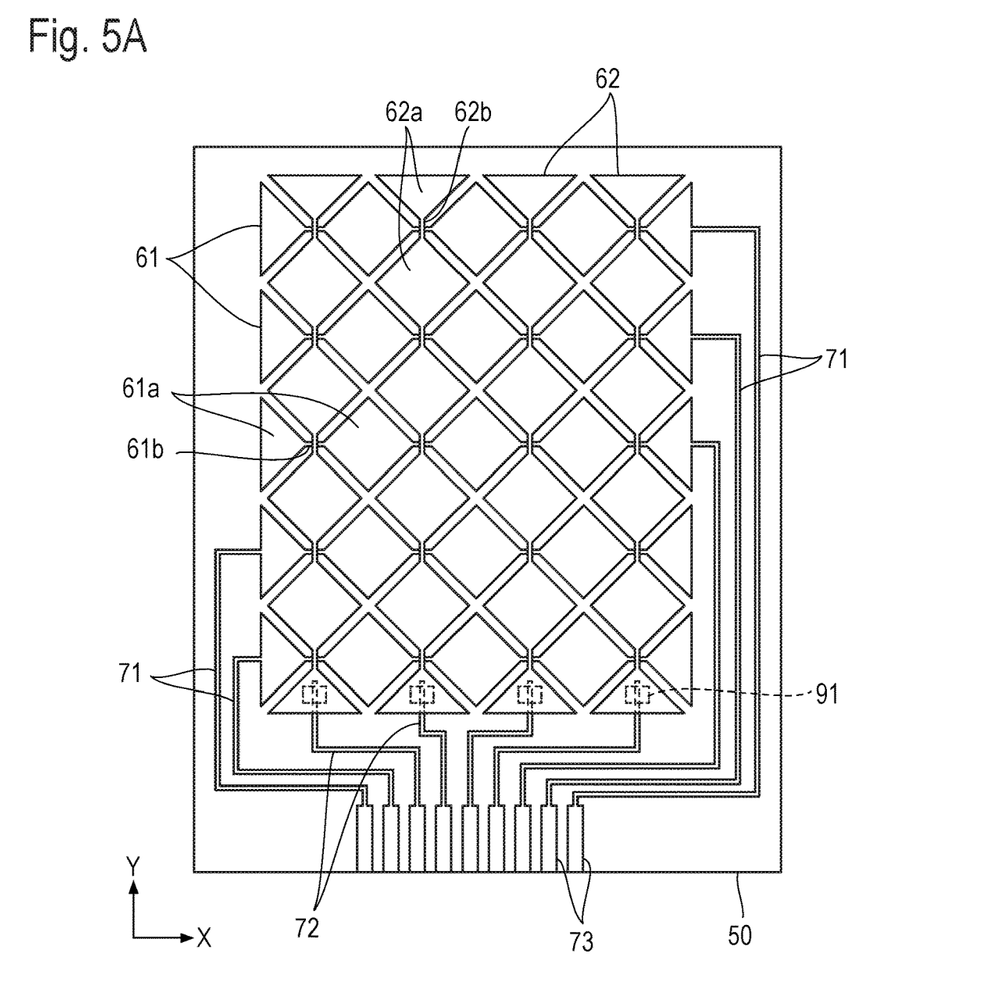
FIG. 5A is a plan view illustrating outline of a touch panel to which an embodiment of the insulator film formation method by flexographic printing according to the present invention is applied.
Figure 5B:
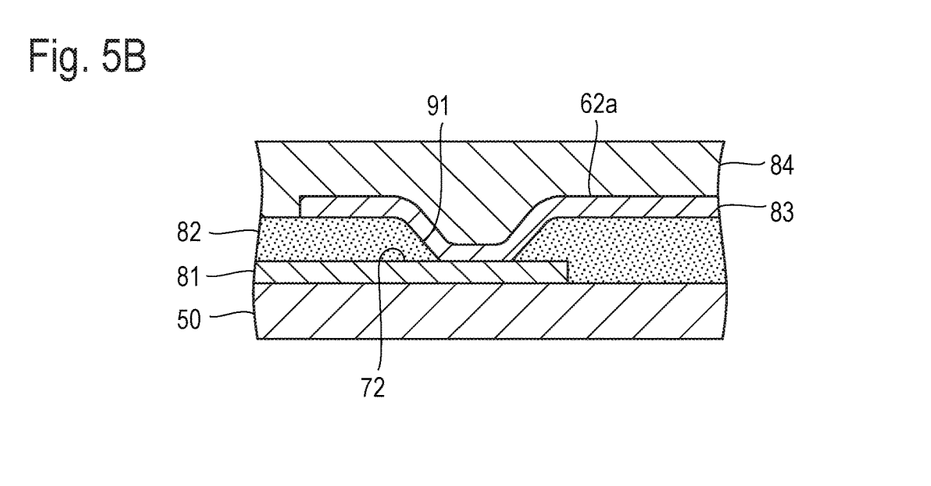
FIG. 5B is a partial enlarged sectional view of FIG. 5A.

FIGS. 5A and 5B illustrate a capacitive touch panel in which an embodiment according to the present invention is applied. The touch panel includes a rectangular transparent substrate 50. On the transparent substrate 50, first sensor electrode arrays 61 and second sensor electrode arrays 62 are formed. The first sensor electrode arrays 61 extend along the X direction that is parallel with the short sides of the transparent substrate 50 and are arranged in parallel with the Y direction that is parallel with the long sides of the transparent substrate 50. The second sensor electrode arrays 62 extend along the Y direction and are arranged in parallel with the X direction.

From one end of each of the first sensor electrode arrays 61, a lead-out wire 71 is led out. From one end of each of the second sensor electrode arrays 62, a lead-out wire 72 is led out. These lead-out wires 71 and 72 extend to terminal parts 73 formed in the vicinity of the center of one of the short sides of the transparent substrate 50.

Each of the first sensor electrode array 61 includes island-shaped electrode parts 61a arranged in the X direction and connection parts 61b, each of the connection parts 61b connecting adjacent two of the island-shaped electrode parts 61a. Each of the second sensor electrode array 62 includes island-shaped electrode parts 62a arranged in the Y direction and connection parts 62b, each of the connection parts 62b connecting adjacent two of the island-shaped electrode parts 62a.

The touch panel has a structure in which a first conductor film 81, an insulator film 82, a second conductor film 83, and a protection film 84 are sequentially laminated on the transparent substrate 50, as illustrated in FIG. 5B. The first sensor electrode arrays 61, the lead-out wires 71 and 72, and the terminal parts 73 are formed by the first conductor film 81, and the second sensor electrode arrays 62 are formed by the second conductor film 83 that is insulated from the first conductor film 81 with the insulator film 82. The first sensor electrode arrays 61 and the second sensor electrode arrays 62 are crossed in such a way as to be insulated from each other. The connection parts 61b and 62b are positioned such that the connection parts 61b and 62b are overlapped with each other. It should be noted that, in FIG. 5A, illustration of visible outlines of the insulator film 82 and the protection film 84 is omitted.

Each of the second sensor electrode arrays 62 is connected to the lead-out wire 72 at the part of a through hole 91 formed on the insulator film 82. The through holes 91 are provided so as to correspond to the positions where the island-shaped electrode parts 62a at the lower end in the Y direction of the second sensor electrode arrays 62 are positioned, as illustrated in FIG. 5A.

FIG. 5B illustrates a cross section of the part of the through hole 91. The insulator film 82 is formed by the insulator film formation method by flexographic printing, which is an embodiment of the present invention, and thus does not have the protrusions. Furthermore, the inner wall surface of the through hole 91 is formed so as to have a gentle slope surface. With this structure, problems of electrical conduction continuity and poor electrical connection can be prevented and the second sensor electrode arrays 62 and the lead-out wires 72 can be desirably connected, whereby improvement in productivity can be accomplished.

It should be noted that though the detailed illustration is omitted in FIG. 5A, the touch panel can be manufactured by a printing process with the method including: forming each of the first sensor electrode arrays 61, the second sensor electrode arrays 62, the lead-out wires 71 and 72, and the terminal parts 73 as a mesh pattern of conductor thin lines by gravure offset printing using a conductive ink such as silver; forming the insulator film 82 by flexographic printing as described above; and forming the protection film 84 by flexographic printing. This can promote a significant cost reduction.

The foregoing description of the embodiment of the invention has been presented for the purpose of illustration and description. It is not intended to be exhaustive or to limit the invention to the precise form disclosed. Modifications or variations are possible in light of the above teachings. The embodiment was chosen and described to provide the illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A flexographic printing plate for receiving ink from an anilox roll and transferring ink to a printing object, the flexographic printing plate comprising:
   a convex portion having a top surface with convexly formed halftone dots thereon defining a printing pattern,
   the halftone dots having top surfaces to retain the ink thereon defining an ink retention volume, and
   the halftone dots being arranged such that a number of lines per inch of the printing pattern increases toward an inner and/or outer peripheral edge of the printing pattern such that the ink retention volume decreases toward the inner and/or outer peripheral edge of the printing pattern.

2. The flexographic printing plate according to claim 1, wherein the halftone dots are arranged to keep a halftone dot area ratio constant.

3. The flexographic printing plate according to claim 2, wherein the number of lines per inch is set to 300 LPI and increases toward the inner and/or outer peripheral edge to 600 LPI, wherein the halftone dot area ratio is 70%.

4. The flexographic printing plate according to claim 1, the number of lines per inch of the printing pattern increases in a step-wise fashion.

5. The flexographic printing plate according to claim 1, wherein the number of lines per inch of the printing pattern increases at only a portion of the inner peripheral edge and/or outer peripheral edge.

6. The flexographic printing plate according to claim 1, wherein the number of lines per inch of the printing pattern increases around the entirety of the inner peripheral edge and/or outer peripheral edge in the shape of a loop.

7. The flexographic printing plate according to claim 6, wherein the number of lines per inch increases concentrically in a step-wise fashion.

8. The flexographic printing plate according to claim 6, wherein the inner peripheral edge is a rectangular shape having four sides, wherein the number of lines adjacent each side may be the same or different.

9. The flexographic printing plate according to claim 8, wherein the four sides comprises a first side and an opposing second side and a third side and an opposing fourth side, wherein adjacent the first side is a first number of lines per inch, adjacent the second number of lines per inch, and adjacent a third and fourth sides is a third number of lines per inch, wherein the first number of lines per inch is greater than the second number of lines per inch and the second number of lines per inch is greater than the third number of lines per inch.

10. A method of forming an insulator film by flexographic printing, the method comprising:
    forming an insulator film on a printing object using ink of an insulator film material and the flexographic printing plate of claim 1.

11. The method of forming an insulator film by flexographic printing according to claim 10, wherein
    the number of lines per inch of the printing pattern increases at only a portion of the outer peripheral edge, the portion being at a rear end side in a printing direction of the printing pattern.

12. The method of forming an insulator film by flexographic printing according to claim 10, wherein
    the insulator film is formed between two conductor films and has a through hole for connecting the two conductor films, and
    the through hole corresponds to an inner peripheral edge in the printing pattern in the printing pattern the number of lines per inch of the printing pattern increases around the entirety of the inner peripheral edge in the shape of a loop.

* * * * *